United States Patent
Qian et al.

(10) Patent No.: US 10,884,472 B2
(45) Date of Patent: Jan. 5, 2021

(54) CURRENT COMPENSATION DURING DYNAMIC VOLTAGE AND FREQUENCY SCALING TRANSITIONS

(71) Applicant: Oracle International Corporation, Redwood Shores, CA (US)

(72) Inventors: Yufei Qian, Seattle, WA (US); Yifan YangGong, Milpitas, CA (US); Sebastian Turullols, Los Altos, CA (US)

(73) Assignee: Oracle International Corporation, Redwood Shores (CA)

( * ) Notice: Subject to any disclaimer, the term of this patent is extended or adjusted under 35 U.S.C. 154(b) by 243 days.

(21) Appl. No.: 15/965,765

(22) Filed: Apr. 27, 2018

(65) Prior Publication Data

US 2019/0332156 A1   Oct. 31, 2019

(51) Int. Cl.
*G06F 1/3206* (2019.01)
*G06F 1/324* (2019.01)

(52) U.S. Cl.
CPC ............ *G06F 1/3206* (2013.01); *G06F 1/324* (2013.01)

(58) Field of Classification Search
CPC .................................................. G06F 1/3206
See application file for complete search history.

(56) References Cited

U.S. PATENT DOCUMENTS

| | | | |
|---|---|---|---|
| 7,363,523 B2 | 4/2008 | Kurts et al. | |
| 8,775,839 B2 | 7/2014 | Cousson et al. | |
| 8,990,591 B2 | 3/2015 | Zou et al. | |
| 9,652,019 B2 | 5/2017 | Dongara et al. | |
| 9,843,262 B2 | 12/2017 | Shepard et al. | |
| 2004/0105284 A1* | 6/2004 | May | H02M 1/32 363/50 |
| 2009/0248931 A1* | 10/2009 | Kato | G06F 13/24 710/109 |
| 2012/0151225 A1* | 6/2012 | Huang | G06F 1/26 713/300 |
| 2015/0346798 A1 | 12/2015 | Dongara et al. | |
| 2016/0179167 A1* | 6/2016 | Yeo | H02J 13/00001 713/340 |

OTHER PUBLICATIONS

Extended European Search Report in Appl. No. 19170637.3 dated Aug. 2, 2019, 9 pages.

* cited by examiner

*Primary Examiner* — Kim Huynh
*Assistant Examiner* — Joshua Neveln
(74) *Attorney, Agent, or Firm* — Kowert, Hood, Munyon, Rankin & Goetzel, P.C.

(57) ABSTRACT

A method for adjusting operation parameters of a computer system based on power consumption of the computer system is disclosed. During a power state transition of the computer system, a voltage level of a power supply signal may be sampled at a plurality of time points to generate a multiple voltage level samples. A voltage level of a selected one of the multiple voltage level samples may be adjusted using a particular coefficient of multiple coefficients to generate an updated voltage level sample. A power consumption of the computer system may be determined using the updated voltage level sample, and based on the power consumption, at least one operation parameter of the computer system may be adjusted.

19 Claims, 7 Drawing Sheets

CURRENT COMPENSATION DURING DYNAMIC VOLTAGE AND FREQUENCY SCALING TRANSITIONS

BACKGROUND

Technical Field

This disclosure relates to power management in integrated circuits, and more particularly to current monitoring during power state changes.

Description of the Related Art

Modern integrated circuits include multiple circuit blocks, each designed to perform particular computing tasks. For example, an integrated circuit may include one or more memory circuits configured to store data, software program instructions, and the like. Alternatively, or additionally, an integrated circuit may include one or more processors or processor cores configured to execute program instructions.

In some integrated circuits, different circuit blocks may operate using different power supply voltage levels. The different circuit blocks may also operate using different clock signals, each of which may have a different frequency. During operation, the voltage levels of power supply signals and the frequencies of clock signals may be modified as part of dynamic voltage and frequency scaling (DVFS).

DVFS may be performed in an integrated circuit based on changes in processing requirements of the integrated circuit, and may result in changes in a power state of a particular circuit block, portion of a circuit block, or any suitable portion of the integrated circuit. Such changes in power state may be in response to monitoring power consumption, performance, or another operating parameter of the integrated circuit, or may be the result of a user-request, execution of a software or program instruction, or the like. Different power states may include different voltage levels for power supply signals, as well as different frequencies of clock signals.

SUMMARY OF THE EMBODIMENTS

Various embodiments of a method for controlling operation parameters of a computer system during a power state transition are disclosed. Broadly speaking, a computer system may include a voltage regulator circuit configured to generate a power supply signal for the computer system. The computer system may also include a power control circuit configured to sample, during a power state transition, a voltage level of a power supply signal at a plurality of time points to generate a plurality of voltage level samples, and select a particular voltage level sample of the plurality of voltage level samples. The power control circuit may also be configured to adjust a voltage level of the particular voltage level sample using a particular coefficient of a plurality of coefficients to generate an updated voltage level sample, and determine a power consumption of the computer system using the updated voltage level sample. Based on the power consumption, the power control circuit may adjust at least one operation parameter of the computer system.

In another embodiment, the power state transition includes a transition from an initial power state to a final power state. A power supply voltage level associated with the initial power state may be less than a power supply voltage level associated with the final power state.

In a non-limited embodiment, to determine the power consumption of the computer system, the power control circuit may be further configured to determine an updated zero load voltage level of the power supply signal using the updated voltage level sample, the power supply voltage level associated with the initial power state, and the power supply voltage level associated with the final power state. The power control circuit may be further configured to determine a current offset using a current offset associated with the initial power state and a current offset associated with the final power state.

Figure 1:
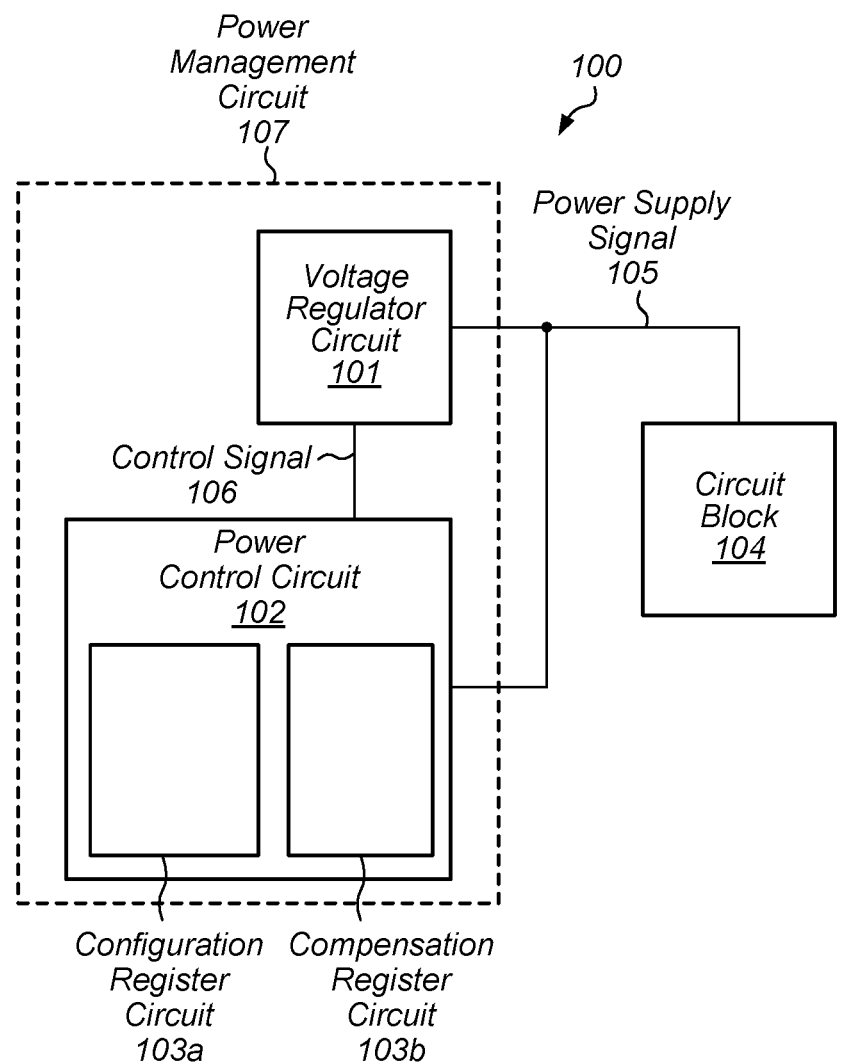
FIG. 1 is a block diagram of an embodiment of a computer system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Modern computer systems, including systems-on-a-chip (SoCs), include multiple circuit blocks that are configured to perform different tasks. During operation of the computer system, individual circuit blocks may have different performance characteristics based on operations being performed by the computer system. To manage the different performance characteristics of the individual circuit blocks and the overall computer system, power management circuits employ dynamic voltage and frequency scaling (DVFS) to adjust voltage levels of power supply signals, and frequencies of clock or other timing reference signals, based on performance demands of the computer system.

When employing DVFS, circuit blocks or groups of circuit blocks transition from one power state to another based on processing demands. As used and described herein, a power state refers to a particular state of power supply voltage levels and clock frequencies for a given circuit or computer system. Conventional methods for calculating power consumption, and subsequently modifying system operation parameters, are inaccurate when DFVS is used due to the change in power supply voltage levels. The embodiments illustrated in the drawing and described below may provide techniques for utilizing DVFS, while maintaining accuracy in power consumption calculations, thereby improving the performance power tradeoff of a computer system.

A block diagram depicting an embodiment of a computer system is illustrated in FIG. 1. In the illustrated embodiment, computer system 100 includes power management circuit 107, and circuit block 104. Power management circuit 107 includes voltage regulator circuit 101, and power control circuit 102. In the present embodiment, power control circuit 102 includes configuration register 103a and compensation register 103b.

Voltage regulator circuit 101 may be configured to generate power supply signal 105 for computer system 100. In various embodiments, voltage regulator circuit 101 may include a comparator circuit (not shown) configured to compare a voltage level of power supply signal 105 to a reference voltage level, and based on results of the comparison, adjust the voltage level of power supply signal 105. Voltage regulator circuit 101 may, in other embodiments, include one or more passive circuit elements, such as inductors, for example.

During changes in power state, voltage regulator circuit 101 may modify the voltage level of power supply signal 105 based on a state of control signal 106. In some cases, control signal 106 may be a digital signal including one or more data bits. Alternatively, control signal 106 may an analog signal whose voltage level encodes information for use by voltage regulator circuit 101.

Power control circuit 102 may be configured to sample, during a power state transition of computer system 100, the voltage level of the power supply signal 105 at a plurality of time points to generate a plurality of voltage level samples, and select a particular voltage level sample of the plurality of voltage level sample. Additionally, power control circuit 102 may be configured to adjust a voltage level of the particular voltage level sample using a particular coefficient of a plurality of coefficients to generate an updated voltage level sample, and determine a power consumption of the computer system using the updated voltage level sample. Based on the power consumption, power control circuit 102 may be configured to adjust at least one operation parameter of the computer system based on the power consumption.

As used and described herein, an operation parameter of a computer system is a value associated with a signal or circuit that affects the operation of the computer system. For example, in some cases, an operation parameter may include a voltage level of a power supply signal of the computer system, a frequency of a clock signal included in the computer system, or any other suitable value associated with a signal or circuit included in the computer system.

In some embodiments, the power state transition may include a transition from an initial power state to a final power state, where a power supply voltage level associated with the initial power state is less than a power supply voltage level associated with the final power state.

To determine the power consumption of the computer system, power control circuit 102 may be further configured to determine an updated zero load voltage level of the power supply signal using the updated voltage level sample, the power supply voltage level associated with the initial power state, and the power supply voltage level associated with the final power state. Additionally, power control circuit 102 may be further configured to determine a current offset using a current offset associated with the initial power state and a current offset associated with the final power state.

The power control circuit may, in some embodiments, be further configured to determine the updated zero load voltage level and the current offset using a particular coefficient of a plurality of coefficients, where selection of the particular coefficient of the plurality of coefficients may be based on a selection of the particular voltage level sample.

As described below in more detail, certain operating characteristics of power control circuit 102 may be determined based on values stored in configuration register 103a. Additionally, to select the particular voltage level sample of the plurality of voltage level samples, power control circuit 102 may be configured to select the particular voltage level sample based on a plurality of mask bits stored in compensation register 103b.

In various embodiments, power control circuit 102 may include any suitable combination of logic circuits, sequential logic circuits, state machine circuits, and the like. Power control circuit 102 may, in some embodiments, include a general-purpose processor or processor core configured to execute software or program instructions.

Circuit block 104 is coupled to power supply signal 105. In various embodiments, circuit block 104 may include any suitable collection of analog or digital circuits configured to perform a desired function or functions using a voltage level of power supply signal 105. For example, in some embodiments, circuit block 104 may include one or more processors or processor cores configured to execute software or program instructions. Alternatively, or additionally, circuit block 104 may include one or more memory circuits configured to store data, or software or program instructions. Although only a single circuit block, i.e., circuit block 104, is depicted in FIG. 1, in other embodiments, any suitable number of circuit blocks may be employed.

It is noted that the embodiment depicted in FIG. 1 is merely an example. In other embodiments, different circuit blocks and different arrangements of circuit blocks are possible and contemplated.

Figure 2:
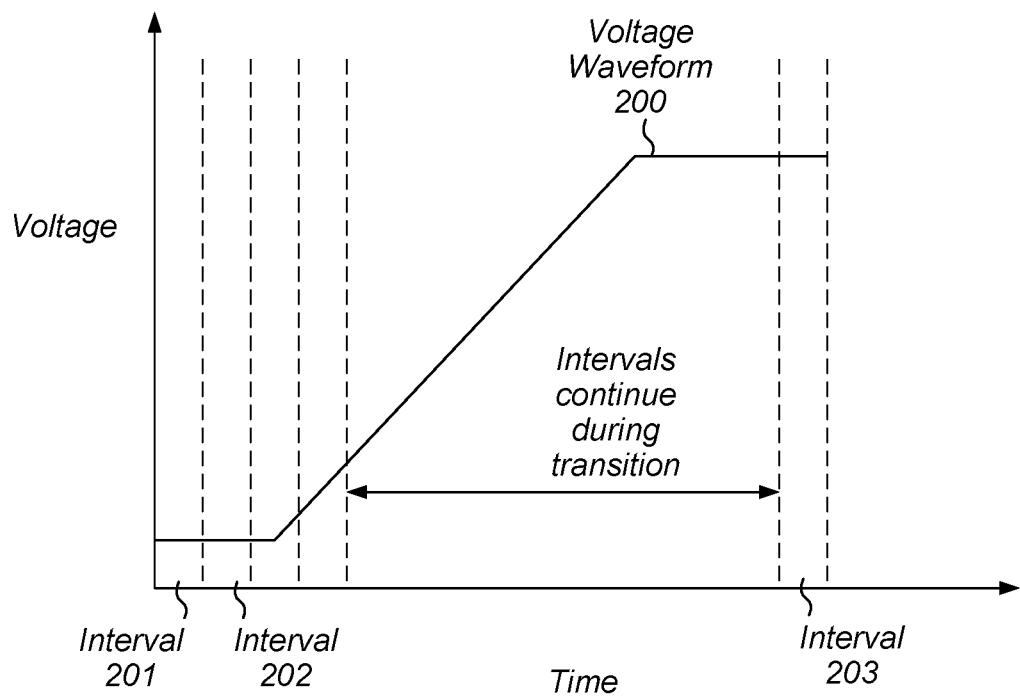
FIG. 2 illustrates an example voltage waveform and sampling intervals.

As described above, the power supply signal may be sampled at multiple times during the power state transitions. An example depicting the relationship between the sample intervals and a voltage waveform is illustrated in FIG. 2. In the illustrated embodiments, voltage waveform 200 is sampled at intervals 201 through 203.

As the power state transition begins, a power control circuit samples voltage waveform 200 during interval 201 and interval 202. The sampling continues at multiple intervals (not shown) as the voltage level of voltage waveform 200 begins to increase. As the power state transition ends, the power control circuit samples voltage waveform 200 at interval 203. For the purposes of clarity, the sampling intervals during the rest of the power state transition have been omitted.

In various embodiments, the number and size of sample intervals, used to sample voltage waveform 200 may be determined based on one or more values included in a configuration registers, such as configuration register 103a, for example.

In some embodiments, the intervals during which sampling occurs may be based on one or more mask bits. Such mask bits may be stored, along with multiple coefficients used in the determination of power consumption, in a compensation register, such as compensation register 103b, for example.

It is noted that the embodiment depicted in FIG. 2 is merely an example. In other embodiments, different numbers of intervals and different sizes of intervals are possible and contemplated.

Figure 3:
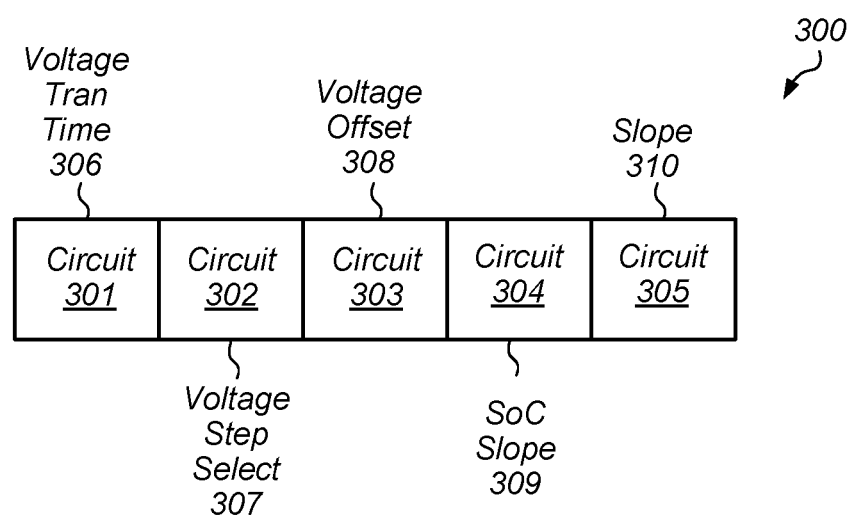
FIG. 3 illustrates a block diagram of a configuration register circuit.

As described above, certain control settings associated with a power control circuit may be stored in a configuration register. An embodiment of a configuration register circuit is illustrated in FIG. 3. In various embodiments, configuration register circuit 300 may correspond to configuration register circuit 103a as illustrated in the embodiment of FIG. 1. The values stored in configuration register circuit 300 may be set in response to execution of program instructions by the computer system. Such values may be programmed during a boot routine, and may vary from one computer system to another. In some embodiments, configuration register circuit 300 may be protected from being re-written while the computer system is operating.

In the present embodiment, configuration register circuit 300 includes circuit 301 through circuit 305. Each of circuit 301 through circuit 305 may include multiple data storage circuits, each of which may be configured to store a single data bit. Such data storage circuits may include, without limitation, latch circuits, flip-flop circuits, or any other suitable data storage circuit capable of storing a data bit.

Circuit 301 is configured to store voltage tran time 306. In various embodiments, voltage tran time 306 may correspond to timeout value for an expected voltage transition on a power supply signal. Additionally, circuit 302 is configured to store voltage step select 307. In some embodiments, voltage step select 307 may correspond to a voltage step size used in accessing a lookup table containing leakage current values.

Circuit 303 is configured to store voltage offset 308, which, in various embodiments, may correspond to a voltage offset using in access the lookup table containing leakage current values. Circuit 304 is configured to store SoC slope 309, and circuit 305 is configured to store slope 310. In some embodiments, SoC slope 309 may correspond to a load line value for the SoC, and slope 310 may correspond to a load line value for a power supply signal.

It is noted that the embodiment depicted in the block diagram of FIG. 3 is merely an example. In other embodiments, different number of configuration settings may be stored in configuration register circuit 300.

Figure 4:
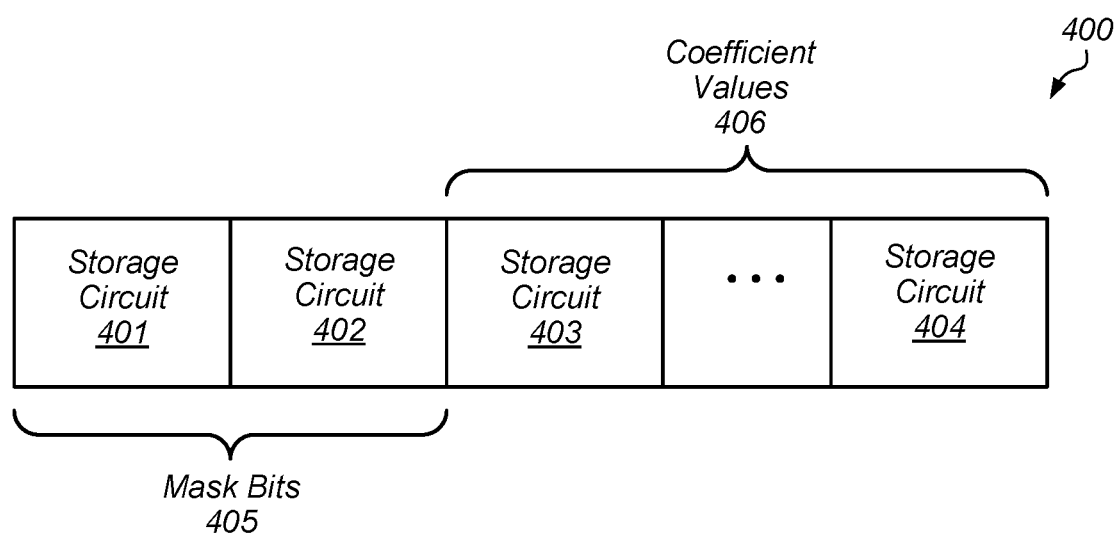
FIG. 4 illustrates a block diagram of a compensation register circuit.

As described below in more detail, determining a power consumption of the computer system may employ the use of multiple coefficients. An embodiment of a compensation register circuit configured to store such coefficients is illustrated in FIG. 4. In the illustrated embodiment, compensation register circuit 400 may correspond to compensation register circuit 103b as depicted in the embodiment of FIG. 1.

In the present embodiment, compensation register circuit 400 includes storage circuit 401 through storage circuit 404. Although only four storage circuits are depicted in the embodiment of FIG. 4, in other embodiments, any suitable number of storage circuits may be included in compensation register circuit 400.

Each of storage circuit 401 through storage circuit 404 is configured to store a single data bit. In various embodiments, storage circuit 401 through storage circuit 404 may be particular embodiments of latch circuits or flip-flop circuits configured to store data bits. Such latch or flip-flop circuits may be configured to store data in response to an assertion or de-assertion of a clock signal or other timing reference signal.

Data bits stored in different storage circuit may be used for different purposes. For example, data bits stored in storage circuit 401 and storage circuit 402 may be used as mask bits 405. During operation of the power control circuit, individual bits of mask bits 405 may be used to select which voltage level sample is adjusted.

Additionally, the data bits stored in storage circuit 403 and storage circuit 403 include coefficient values 406. Data store in the coefficient value section of compensation register circuit 400 may be further subdivided to store multiple coefficient values. For example, in some cases, compensation register circuit 400 may include 48 bits that are used to store coefficient values. Bits 5:0 may store a value for coefficient 0, while bits 17:12 may store a value for coefficient 2. Individual coefficient values may be encoded in any suitable number format, and may be programmed in response to execution of program instructions by the computer system.

It is noted that the embodiment of a compensation register circuit illustrated in FIG. 4 is merely an example. In other embodiments, different numbers of data bits may be used to encode a particular coefficient value.

Figure 5:
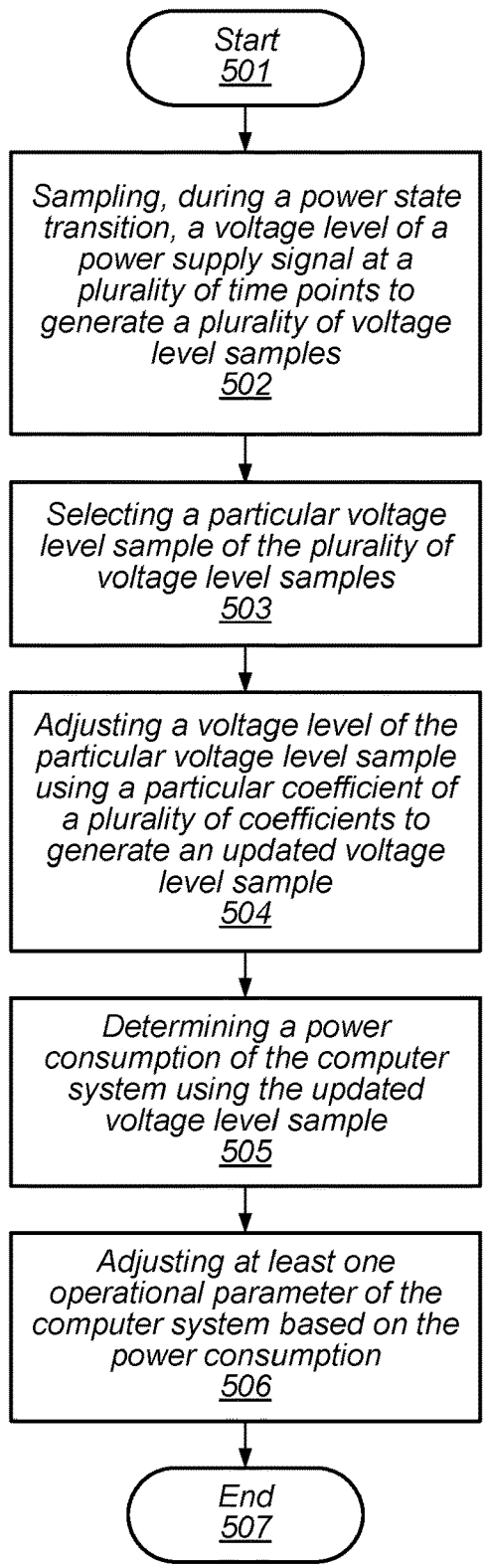
FIG. 5 illustrates a flow diagram depicting an embodiment of a method for operating a power monitor circuit.

Turning to FIG. 5, an embodiment of a method for operating a power management circuit illustrated. In the illustrated embodiment, the method may be employed with any suitable power management circuit, such as, power management circuit 107, for example. The method begins in block 501.

During a power state transition, a voltage level of a power supply signal, included in a computer system may be sampled at a plurality of time points to generate a plurality of voltage level samples (block 502). As described above, during operation of a computer system, a power state for the computer system or particular circuit blocks within the computer system may be adjusted based on performance needs, power consumption of the computer system, and the like. When a power state is changed, a voltage level of the power supply signal, such as, e.g., power supply signal 105 may be modified based on the desired power state. As the voltage level of the power supply signal is transitioning to a new value, the voltage level of the power supply signal may be repeatedly sampled at respective time points during the transition of the power supply signal. In some embodiments, the power state transition may include a transition from an initial power state to a final power state, where a power supply voltage level associated with the initial power state is less than a power supply voltage level associated with the final power state.

A particular voltage level sample of the plurality of voltage level samples may then be selected (block 503). In various embodiments, the contents of a register circuit, such as, e.g., register circuit 103, or other storage circuit may be used select the particular voltage level sample. In some cases, each mask bit of multiple mask bits stored in the register circuit may correspond to a particular voltage level sample, and the value of particular mask bit of the multiple mask bits may be indicative of whether a corresponding voltage level sample is selected. In a particular embodiment, the plurality of mask bits in the register circuit may be initialized, in response to the computer system executing program instructions.

A voltage level of the particular voltage level sample may be adjusted using a particular coefficient of a plurality of coefficients to generate an updated voltage level sample (block 504). In various embodiments, the particular coefficient of the plurality of coefficients may be retrieved from a register circuit, such as, register circuit 103, for example.

The adjustment may be made according to one of various arithmetic operations, such as, addition, multiplication, and the like.

A power consumption of the computer system may be determined using the updated voltage level sample (block 505). The power consumption may be determined using a current offset and a voltage factor. In some cases, the current offset and the voltage factor may be retrieved from a lookup table or other suitable storage circuit. During a power state transition, however, the current offset and the voltage factor may be calculated as described below in regard to FIG. 6.

At least one operation parameter of the computer system may be adjusted based on the power consumption (block 506). In various embodiments, the at least one operation parameter may include an operation parameter that affects a voltage level of a power supply signal. Alternatively, or additionally, the at least one operation parameter may include an operation parameter than affects a frequency of a clock signal or other signal used as a timing reference for circuit blocks included in the computer system. The method may then conclude in block 507.

It is noted that the embodiment of the method depicted in FIG. 5 is merely an example. In other embodiments, different operations and different numbers of operations may be employed.

Figure 6:
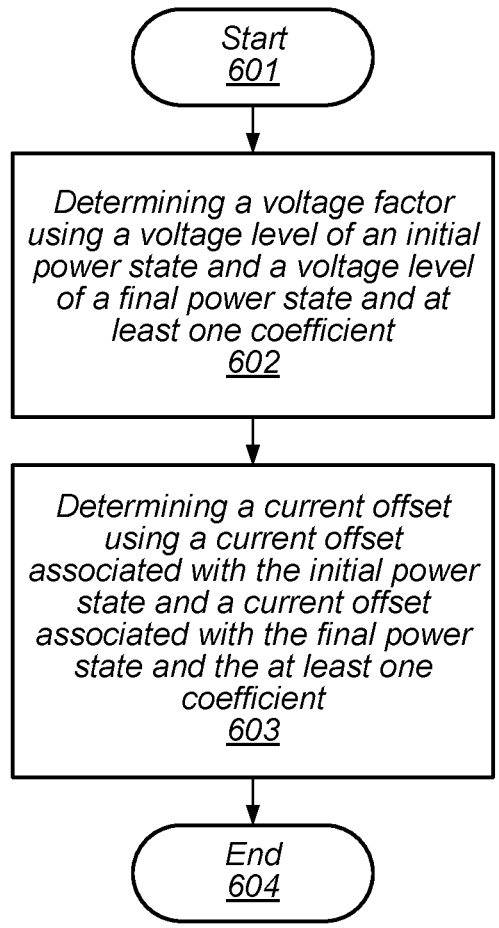
FIG. 6 illustrates a flow diagram depicting an embodiment of a method for determining power consumption of a computer system.

Turning to FIG. 6, a flow diagram depicting an embodiment of a method for determining a power consumption of a computer system is illustrated. In various embodiments, the embodiment of the method illustrated in FIG. 6 may be included as part of block 505 as depicted in the flow diagram of FIG. 5. The method begins in block 601.

A voltage factor may be determined using a voltage level of an initial power state and a voltage level of a final power state and at least one coefficient (block 602). As described above, a power state transition may include a change from low power supply voltage level to high power supply voltage level. In such cases, the voltage factor may be calculated using Equation 1, where $\text{volt}_{low}$ is a zero load voltage of the lower power state, and $\text{volt}_{high}$ is the zero load voltage of the higher power state. In various embodiments, the voltage factor may be used to generate an updated zero load voltage level, which is, in turn, used to determine the power consumption $$\text{voltage}_{factor} = \text{volt}_{low} \, \text{coeff}_0 + \text{volt}_{high}(1 - \text{coeff}_0) \quad (1)$$

A current offset may be determined using a current offset associated with the initial power state and a current offset associated with the final power state and the at least one coefficient (block 603). As with the voltage value, the current offset may be calculated using an equation, such as, e.g., Equation 2, where $\text{cur\_offset}_{low}$ is a current offset associated with the lower power state, and $\text{cur\_offset}_{high}$ is a current offset associated with the higher power state.

$$\text{current}_{offset} = \text{cur\_offset}_{low} \text{coeff}_0 + \text{cur\_offset}_{high}(1 - \text{coeff}_0) \quad (2)$$

The method may then conclude in block 604. It is noted that the embodiment of the method depicted in the flow diagram of FIG. 6 is merely an example. In other embodiments, different operations and different orders of operations are possible and contemplated.

Figure 7:
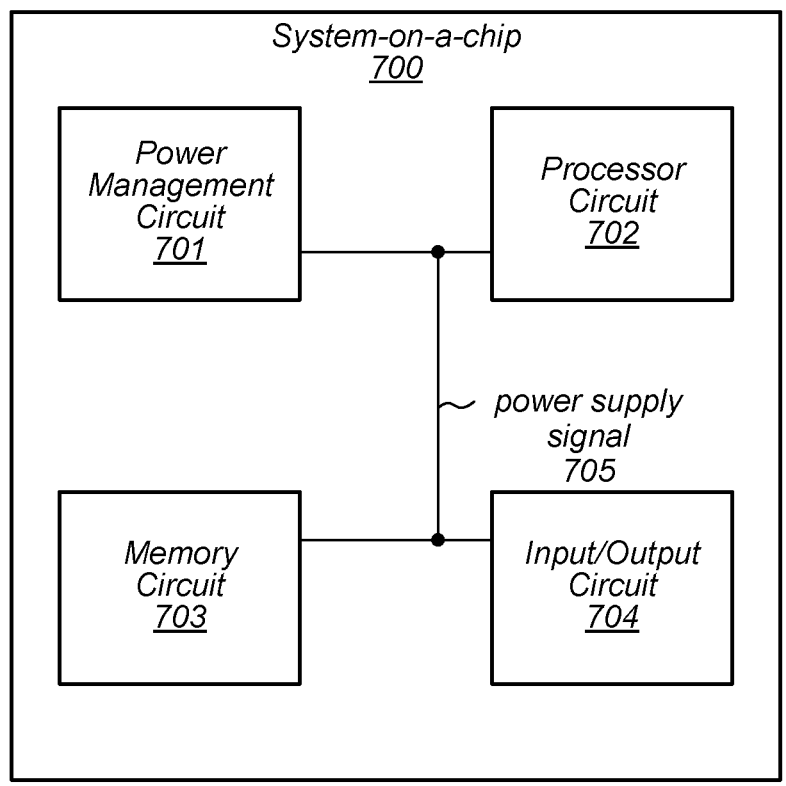
FIG. 7 is a block diagram of one embodiment of a system-on-a-chip that includes a power management circuit.

A block diagram of system-on-a-chip (SoC) is illustrated in FIG. 7. In the illustrated embodiment, the SoC 600 includes power management circuit 701, processor circuit 702, input/output circuit 704, and memory circuit 703. In various embodiments, SoC 700 may be configured for use in a desktop computer, server, or in a mobile computing application such as, e.g., a tablet, laptop computer, or wearable computing device.

Power management circuit 701 may be configured to generate a regulated voltage level on internal power supply 705 in order to provide power to processor circuit 702, input/output circuit 704, and memory circuit 703. In various embodiments, power management circuit 701 may include one or more voltage regulator circuits, such as, e.g., voltage regulator circuit 101 configured to generate the regulated voltage level based on an external power supply (not shown). It is noted that although a single internal power supply is depicted in the embodiment of FIG. 7, in other embodiments any suitable number of internal power supplies may be employed.

Processor circuit 702 may, in various embodiments, be representative of a general-purpose processor that performs computational operations. For example, processor circuit 702 may be a central processing unit (CPU) such as a microprocessor, a microcontroller, an application-specific integrated circuit (ASIC), or a field-programmable gate array (FPGA), or other suitable processing circuit.

Memory circuit 703 may correspond to circuit block 104 as illustrated in FIG. 1, In various embodiments, memory circuit 703 may include any suitable type of memory such as a Dynamic Random-Access Memory (DRAM), a Static Random-Access Memory (SRAM), a Read-only Memory (ROM), Electrically Erasable Programmable Read-only Memory (EEPROM), or a non-volatile memory, for example. It is noted that in the embodiment of an integrated circuit illustrated in FIG. 7, a single memory circuit is depicted. In other embodiments, any suitable number of memory circuits may be employed.

Input/output circuit 704 may be configured to coordinate data transfer between SoC 700 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuit 704 may be configured to implement a version of Universal Serial Bus (USB) protocol or IEEE 1394 (Firewire®) protocol.

Input/output circuit 704 may also be configured to coordinate data transfer between SoC 700 and other computing systems or integrated circuits coupled to SoC 600 via a network. In one embodiment, input/output circuit 704 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuit 704 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a voltage regulator circuit configured to generate a power supply signal for a computer system; and
a power control circuit configured to:
sample, during a power state transition, a voltage level of the power supply signal at a plurality of time points to generate a plurality of voltage level samples;
select a particular voltage level sample of the plurality of voltage level samples using a plurality of mask bits including a given mask bit that corresponds to a given one of the plurality of voltage level samples;
adjust a voltage level of the particular voltage level sample using a particular coefficient of a plurality of coefficients to generate an updated voltage level sample;
determine a power consumption of the computer system using the updated voltage level sample; and
adjust at least one operation parameter of the computer system based on the power consumption.

2. The apparatus of claim 1, wherein the power state transition includes a transition from an initial power state to a final power state, and wherein a power supply voltage level associated with the initial power state is less than a power supply voltage level associated with the final power state.

3. The apparatus of claim 2, wherein to determine the power consumption of the computer system, the power control circuit is further configured to:
determine an updated zero load voltage level of the power supply signal using the updated voltage level sample, the power supply voltage level associated with the initial power state, and the power supply voltage level associated with the final power state; and
determine a current offset using a current offset associated with the initial power state and a current offset associated with the final power state.

4. The apparatus of claim 3, wherein the power control circuit is further configured to determine the updated zero load voltage level and the current offset using a particular coefficient of a plurality of coefficients, wherein selection of the particular coefficient of the plurality of coefficients is based on a selection of the particular voltage level sample.

5. The apparatus of claim 1, further comprising a register circuit configured to store the plurality of mask bits.

6. The apparatus of claim 1, wherein to adjust the at least one operation parameter of the computer system, the power control circuit is further configured to generate a control signal, and wherein the voltage regulator circuit is further configured to adjust a voltage level of the power supply signal based on the control signal.

7. A method, comprising:
sampling, during a power state transition, a voltage level of a power supply signal, included in a computer system, at a plurality of time points to generate a plurality of voltage level samples;
selecting a particular voltage level sample of the plurality of voltage level samples using a plurality of mask bits including a given mask bit that corresponds to a given one of the plurality of voltage level samples;
adjusting a voltage level of the particular voltage level sample using a particular coefficient of a plurality of coefficients to generate an updated voltage level sample;
determining a power consumption of the computer system using the updated voltage level sample; and
adjusting at least one operation parameter of the computer system based on the power consumption.

8. The method of claim 7, wherein the power state transition includes a transition from an initial power state to a final power state, and wherein a power supply voltage level associated with the initial power state is less than a power supply voltage level associated with the final power state.

9. The method of claim 8, wherein determining the power consumption of the computer system includes:
determining an updated zero load voltage level of the power supply signal using the updated voltage level sample, the power supply voltage level associated with the initial power state, and the power supply voltage level associated with the final power state; and
determining a current offset using a current offset associated with the initial power state and a current offset associated with the final power state.

10. The method of claim 9, further comprising determining the updated zero load voltage level and the current offset using a particular coefficient of a plurality of coefficients, wherein selection of the particular coefficient of the plurality of coefficients is based on a selection of the particular voltage level sample.

11. The method of claim 7, further comprising, initializing the plurality of mask bits in a register circuit in response to the computer system executing program instructions.

12. The method of claim 7, wherein adjusting the at least one operation parameter of the computer system includes adjusting a voltage level of the power supply signal.

13. A system, comprising:
a circuit block coupled to a power supply signal; and
a power management unit configured to:
generate a voltage level on the power supply signal;
sample, during a power state transition, the voltage level of the power supply signal at a plurality of time points to generate a plurality of voltage level samples;
select a particular voltage level sample of the plurality of voltage level samples using a plurality of mask bits including a given mask bit that corresponds to a given one of the plurality of voltage level samples;
adjust a voltage level of the particular voltage level sample using a particular coefficient of a plurality of coefficients to generate an updated voltage level sample;
determine a power consumption of the circuit block using the updated voltage level sample; and
adjust at least one operation parameter of the circuit block based on the power consumption.

14. The system of claim 13, wherein the power state transition includes a transition from an initial power state to a final power state, and wherein a power supply voltage level associated with the initial power state is less than a power supply voltage level associated with the final power state.

15. The system of claim 14, wherein to determine the power consumption of the circuit block, the power management unit is further configured to:

determine an updated zero load voltage level of the power supply signal using the updated voltage level sample, the power supply voltage level associated with the initial power state, and the power supply voltage level associated with the final power state; and determine a current offset using a current offset associated with the initial power state and a current offset associated with the final power state.

16. The system of claim 15, wherein the power management unit is further configured to:

selection a particular coefficient of a plurality of coefficients based on a selection of the particular voltage level sample; and determine the updated zero load voltage level and the current offset using the particular coefficient of the plurality of coefficients.

17. The system of claim 13, wherein the power management unit includes a register circuit configured to store the plurality of mask bits.

18. The system of claim 17, wherein the power management unit is further configured to initialize the register circuit.

19. The system of claim 13, wherein to adjust the at least one operation parameter of the circuit block, the power management unit is further configured to adjust the voltage level of the power supply signal.

* * * * *